United States Patent
Esmaili et al.

(10) Patent No.: US 7,911,180 B2
(45) Date of Patent: Mar. 22, 2011

(54) SINGLE-PHASE PHASE LOCKED LOOP SUITABLE FOR USE IN A HYBRID VEHICLE CHARGING SYSTEM AND METHOD FOR CHARGING A HYBRID VEHICLE FROM A SINGLE-PHASE POWER SOURCE

(75) Inventors: Gholamreza Esmaili, Torrance, CA (US); Milun Perisic, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 212 days.

(21) Appl. No.: 12/184,078

(22) Filed: Jul. 31, 2008

(65) Prior Publication Data

US 2010/0026245 A1 Feb. 4, 2010

(51) Int. Cl.
*H02J 7/00* (2006.01)

(52) U.S. Cl. ........ 320/128; 327/156; 180/65.29

(58) Field of Classification Search .......... 320/109, 320/142, 143
See application file for complete search history.

(56) References Cited

U.S. PATENT DOCUMENTS

| | | | | |
|---|---|---|---|---|
| 5,187,427 A * | 2/1993 | Erdman | | 323/207 |
| 6,621,252 B2 * | 9/2003 | Zhang | | 323/205 |
| 6,850,426 B2 * | 2/2005 | Kojori et al. | | 363/123 |
| 6,975,082 B2 * | 12/2005 | Crain et al. | | 318/400.09 |
| 2007/0107957 A1 * | 5/2007 | Lehrer | | 180/65.2 |
| 2007/0170910 A1 * | 7/2007 | Chang et al. | | 324/158.1 |

OTHER PUBLICATIONS

Chung, S.-K, et al "Phase-locked loop for grid-connected three-phase power conversion systems," Electric Power Applications, IEE Proceedings, May 2000, pp. 213-219, vol. 147, No. 3.
Kirby, B. J., et al. "Frequency Control Concerns In The North American Electric Power System," 2002, pp. 1-18.
Zhang, R., et al. "A grid simulator with control of single-phase power converters in D-Q rotating frame," Power Electronics Specialists Conference, IEEE 33rd Annual, 2002, pp. 1431-1436, vol. 3, No. 3.

* cited by examiner

*Primary Examiner* — Edward Tso
*Assistant Examiner* — Ramy Ramadan
(74) *Attorney, Agent, or Firm* — Ingrassia Fisher & Lorenz, P.C.

(57) ABSTRACT

Apparatus for charging an electric vehicle or a hybrid vehicle are provided. Particularly, apparatus for charging a hybrid vehicle from a single-phase standard (110 volt, single-phase, 60 Hz in the U.S.) are provided. In one implementation, a single-phase phase locked loop (PLL) receives a single-phase power gird voltage and delays it by one-quarter cycle to create an orthogonal imaginary second power signal. These signals are then applied to a transform matrix within a PLL to phase lock an output signal to the incoming power grid voltage.

15 Claims, 5 Drawing Sheets

SINGLE-PHASE PHASE LOCKED LOOP SUITABLE FOR USE IN A HYBRID VEHICLE CHARGING SYSTEM AND METHOD FOR CHARGING A HYBRID VEHICLE FROM A SINGLE-PHASE POWER SOURCE

TECHNICAL FIELD

The present invention generally relates to electric and hybrid vehicles and more particularly relates to charging systems for electric and hybrid vehicles and more specifically relates to a single-phase phase locked loop suitable for use in an electric or hybrid vehicle charging system.

BACKGROUND OF THE INVENTION

Contemporary commercially available hybrid vehicles are generally of the dual-mode type having a liquid fueled (gas) powered engine that drives a generator for charging a battery array. The battery array powers one or more electric motors that propel the vehicle using direct current (DC) power alone or in cooperation with the gas engine.

A potential alternate or supplemental charging source for the battery array of a hybrid vehicle is to "plug in" the vehicle to a public or private utility company power grid. This can be done in a driveway, a garage or in a public parking structure. However, to properly charge the battery array, the charging power waveform must be phase locked to the incoming power grid voltage. This can be done for commercial 3-phase (or multi-phase) power signals, however, most home power arrangements do not have 3-phase power systems available and most home owners will not undergo the expense to install them just to charge a hybrid vehicle.

Accordingly, it is desirable to provide a single-phase charging arrangement for a hybrid vehicle so that a hybrid vehicle can be charged from a home line current. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a charging system for a hybrid vehicle includes a single-phase phase locked loop (PLL) coupled to a standard (110 volt, 60 Hz in the United States) power grid voltage. The incoming phase voltage is delayed one quarter cycle to create an imaginary phase, which is orthogonal to the power grid voltage and considered as a second phase signal for the PLL. By applying a transform matrix (discussed below), the present invention is able to phase lock to a single-phase power grid voltage and efficiently and safely charge a hybrid vehicle.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Figure 1A:
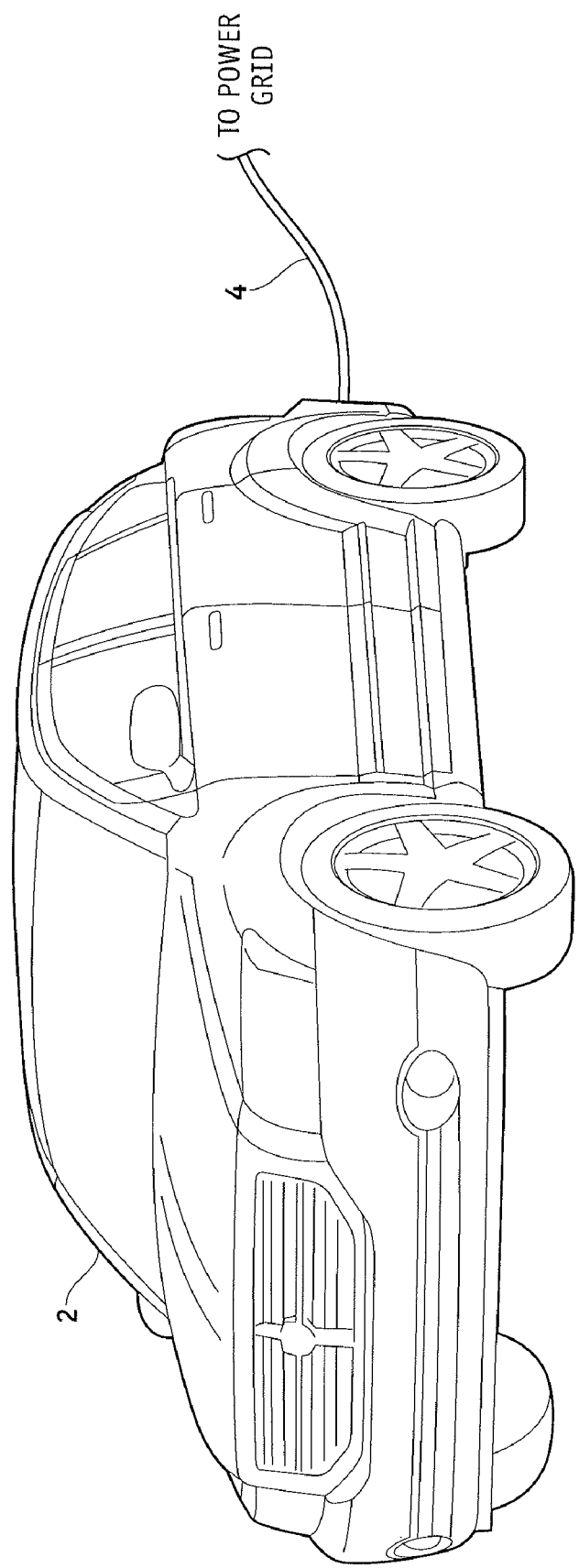
FIG. 1A illustrates a hybrid vehicle having a single-phase power grid charging system according to one exemplary implementation of the present invention.

Referring now to FIG. 1A, a hybrid vehicle 2 is shown which employs the single-phase phase locked loop (PLL) charging system of the present invention. According to the present invention, the hybrid vehicle 2 can have an internal battery array charged by being electrically coupled via a cable 4 to a public or private utility power grid (not shown). In this way, the present invention affords the advantage of being able to charge the battery array of the hybrid vehicle without operating the vehicle or consuming fuel (gas).

In this regard, any of the concepts disclosed here can be applied generally to "vehicles," and as used herein, the term "vehicle" broadly refers to a non-living transport mechanism. Examples of such vehicles include automobiles such as buses, cars, trucks, sport utility vehicles, vans, vehicles that do not travel on land such as mechanical water vehicles including watercraft, hovercraft, boats and ships, and mechanical rail vehicles such as trains, trams and trolleys, etc. In addition, the term "gas engine" is not limited by any specific propulsion technology such as gasoline or diesel fuel. Rather, gas engine also include hydrogen vehicles, ethanol vehicles and vehicles which operate using various other alternative fuels.

Figure 1B:
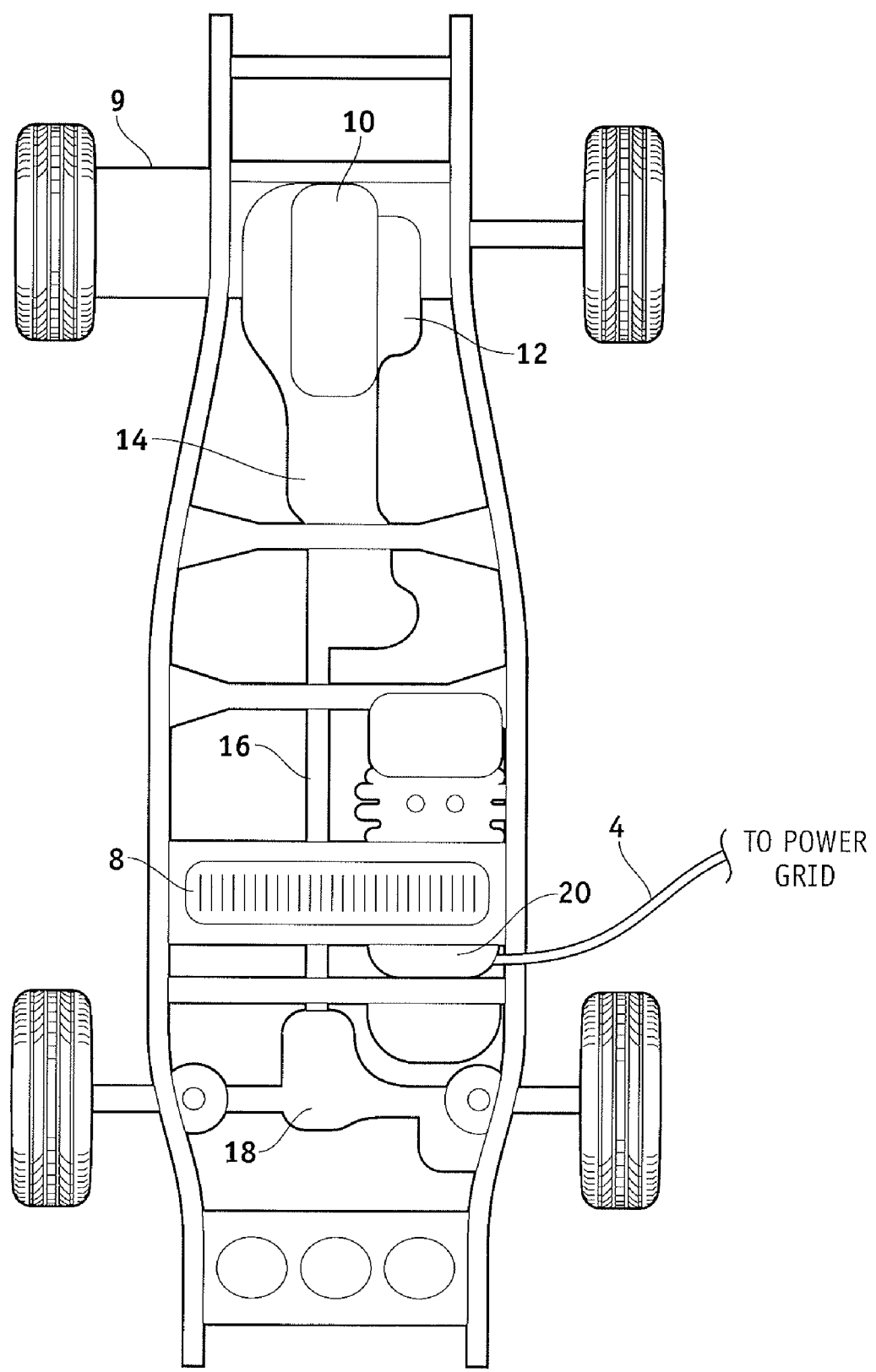
FIG. 1B illustrates the chassis of the hybrid vehicle of FIG. 1A, include the major drive train components thereof.

Referring now to FIG. 1B, a chassis 6 of the hybrid vehicle 2 is shown along with major drive train components. Generally, contemporary hybrid vehicles have a battery array 8 (typically a 300 volt battery array for a standard sized automobile) and a gas engine 10. Alternately, the present invention could be used with an entirely direct current (DC) propulsion system (i.e., a vehicle without a gas engine). For electric (DC) power, an electric motor 9 (more than one can be used) provides front-wheel drive propulsion for the hybrid vehicle 2. In on embodiment, the electric motor 9 is powered by alternating current (AC) generated by a switching circuit as is known in the art. Alternately, the electric motor 9 can be a DC motor powered directly from the battery array 8.

In one embodiment, the gas engine 10 drives a generator 12, which can recharge the battery array 8 when required while the vehicle is operating. A dual-mode transmission 14 allows the gas engine to provide rear-wheel propulsion via a drive shaft 16 and a differential 18. As discussed in conjunction with FIG. 1A, battery array 8 charging circuitry 20 is coupled to a power grid voltage via cable 4. Thus, the present invention affords the opportunity for the hybrid vehicle 2 to be charged from a standard (single-phase, 110 volts, 60 Hz in the U.S.) power grid voltage available generally in homes and businesses.

Figure 2:
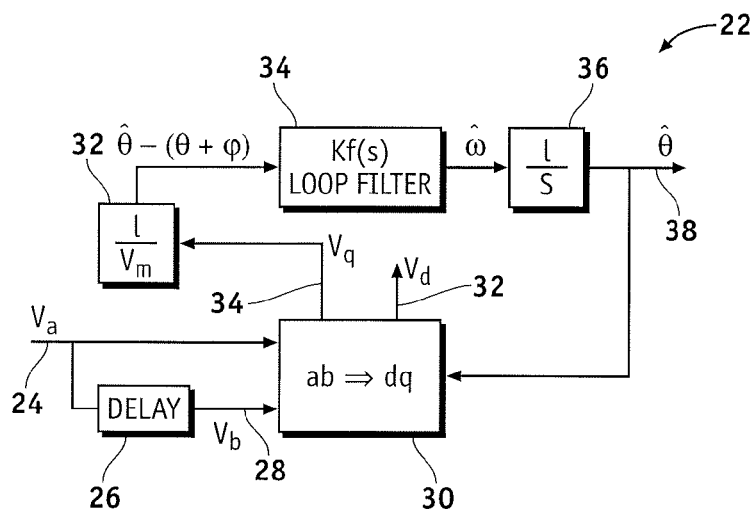
FIG. 2 illustrates a block diagram of a single-phase phase locked loop (PLL) system according to one exemplary implementation of the present invention.

Referring now to FIG. 2, the single-phase phased locked loop (PLL) 22 in accordance with one embodiment of the present invention is shown in block diagram form. The single-phase power grid voltage 24 (Va) is delayed (26) preferably by one-quarter cycle and the phase delayed signal 28 (Vb) is applied to a transform matrix 30. The phase delayed signal 28 is orthogonal to the power grid voltage 24 and can be used as an imaginary second phase signal for phase locking purposes as will be explained below. The transform matrix 30 produces Vd 32 and Vq 34 and Vq is multiplied by a gain factor (1/Vm) where:

$$V_a = V_m \cos(\theta + \varphi) \quad (1);$$

and $$V_b = V_m \cos\left(\theta + \varphi - \frac{\pi}{2}\right) \quad (2)$$

Figure 3A:
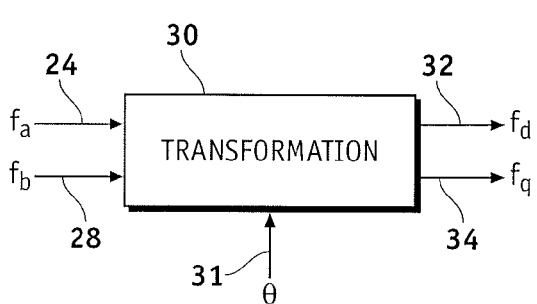
FIG. 3A and FIG. 3B illustrate a preferred transformation matrix of FIG. 2.
Figure 3B:
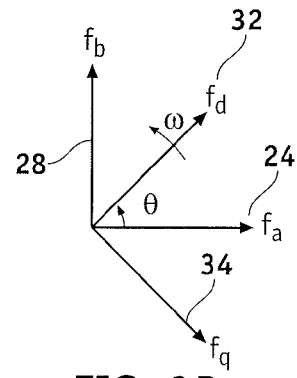

Referring now to FIG. 3A and FIG. 3B, an illustration of how the transformation matrix 30 modifies Va and Vb to create Vd and Vq in accordance with one embodiment of the present invention. As can be seen, Vd (fd) is phase shifted (θ 31) from Va (fa) and Vq (fq) is phase shifted from Vb (fb) as follows:

$$\begin{bmatrix} V_d \\ V_q \end{bmatrix} = \begin{bmatrix} \cos\hat{\theta} & \sin\hat{\theta} \\ \sin\hat{\theta} & -\cos\hat{\theta} \end{bmatrix} \begin{bmatrix} V_a \\ V_b \end{bmatrix} \Rightarrow \begin{cases} V_d = V_m \cos[\hat{\theta} - (\theta + \varphi)] \\ V_q = V_m \sin[\hat{\theta} - (\theta + \varphi)] \end{cases} \quad (3)$$

Therefore, If: $\hat{\theta} - (\theta+\varphi) < 5° \Rightarrow \sin[\hat{\theta}-(\theta+\varphi)] \approx \hat{\theta}-(\theta+\varphi)$ (4)

$$So: \hat{\theta} - (\theta + \varphi) = \frac{V_q}{V_m} \quad (5)$$

Equation 5 demonstrates that the phase difference can be reduced to zero by using the transform matrix 30 along with phase lock elements 32, loop filter 34 and integrator (1/S) 36 such that an output signal 38 can be phased locked to the power grid voltage 24.

Figure 4:
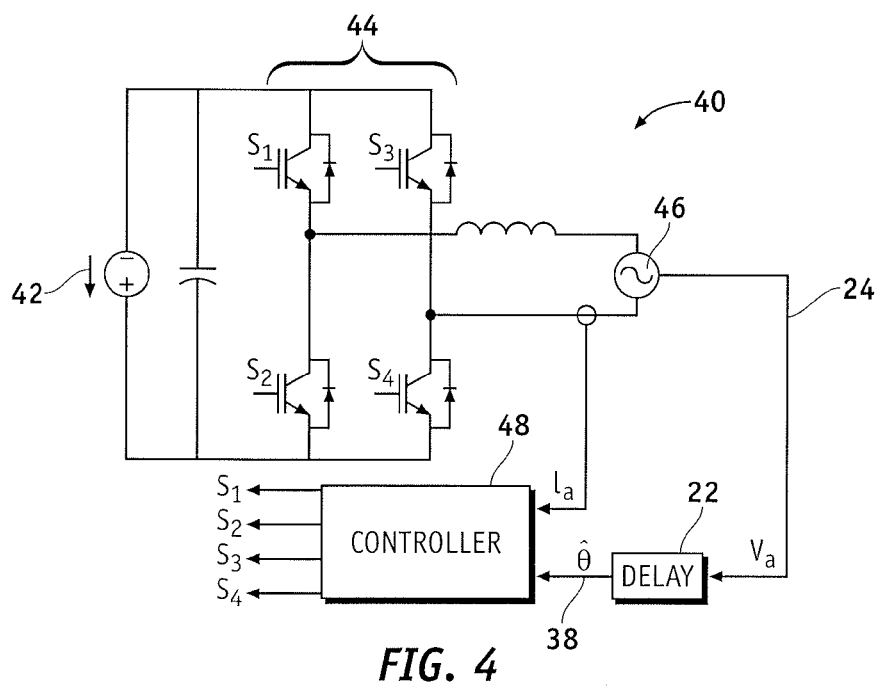
FIG. 4 illustrates a charging system suitable for use in a hybrid vehicle and employing the PLL of FIG. 2.

Referring now to FIG. 4, a charging control system 40 is shown in block diagram form. The charging control system 40 includes the single-phase PLL 22 of FIG. 2 and operates to afford the present invention an alternative or supplemental charging ability for the battery array 8 of the hybrid vehicle 2. As shown in FIG. 4, a DC power source 42 (which in one embodiment can be the battery array 8 of FIG. 1B) is coupled by an H-Bridge circuit 44 to a public or private utility company 46 that provides a single-phase power grid voltage 24 to the PLL 22. As shown in conjunction with FIG. 2, the PLL 22 provides a phase locked output signal 38 to the charging controller 48 that monitors and charges the battery array 8.

Figure 5:
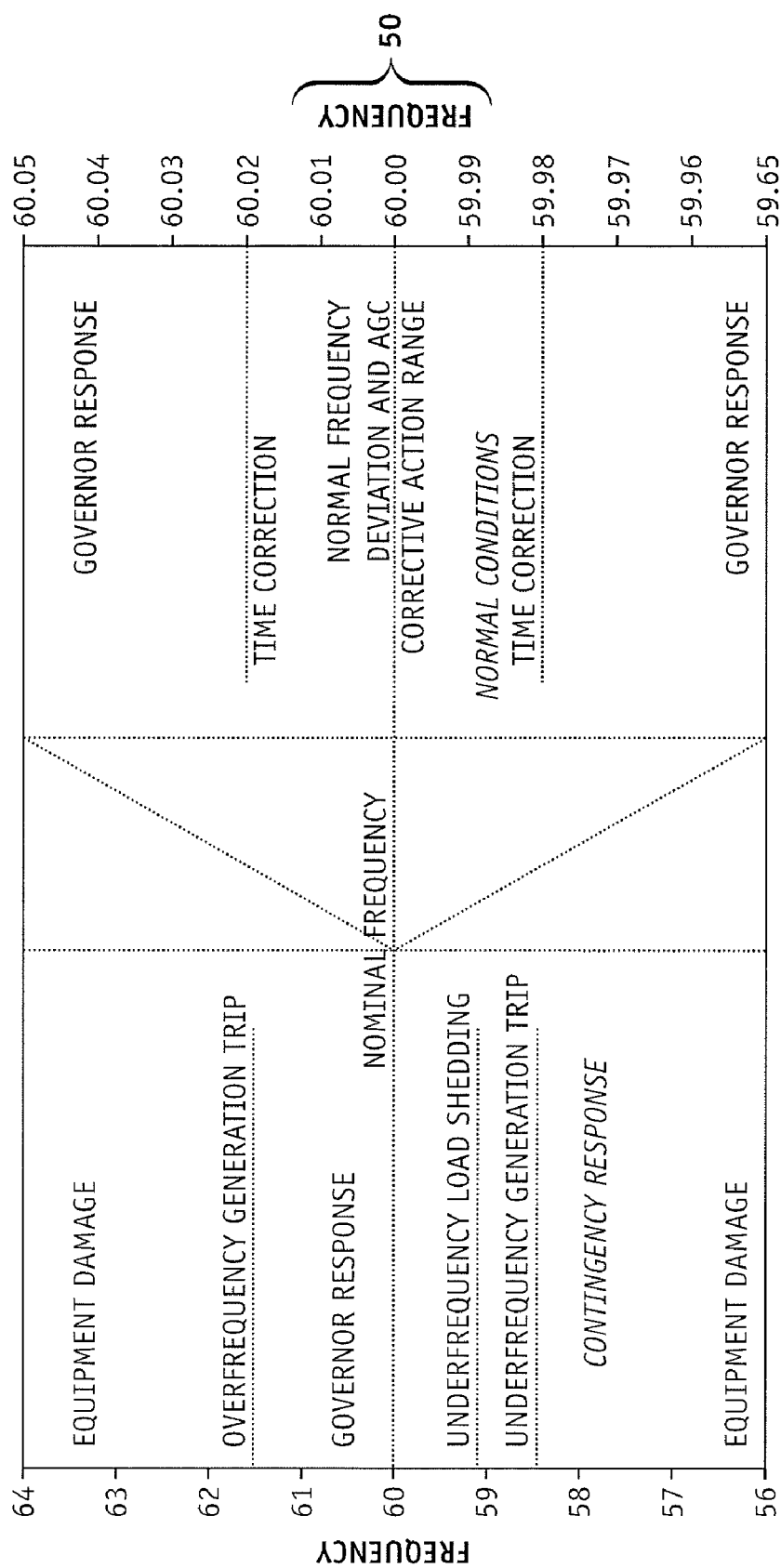
FIG. 5 is an illustration of power grid frequency variation standards for the United States.

Referring now to FIG. 5, there is shown an illustration of the nominal frequency of utility power available in the United States. As can be seen, the nominal frequency resides in the range of 59.95 Hz to 60.05 Hz with the normal frequency deviation (50) residing between 59.99 Hz to 60.01 Hz. Phase error in the incoming power grid voltage can damage equipment or cause equipment malfunctions. Accordingly, phase error in the power grid is tightly regulated. Accordingly the normal frequency deviation 50 sets a minimum operating performance specification for any charging system for a hybrid vehicle that intends to offer battery array charging from a standard home (single-phase) grid voltage.

Figure 6A:
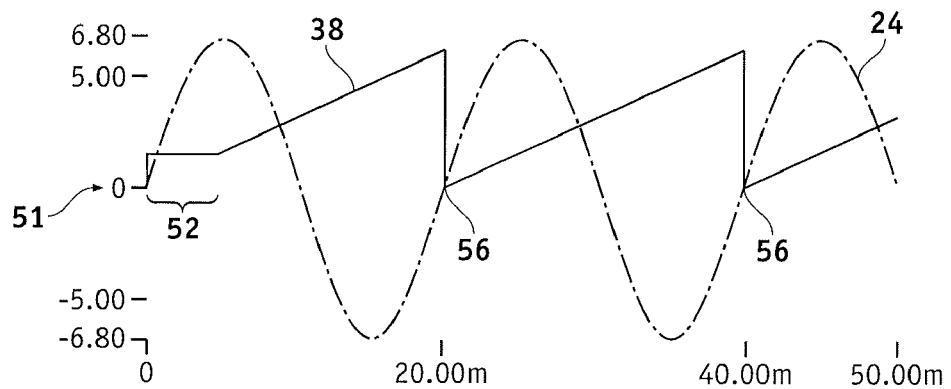
FIGS. 6A and 6B illustrate the phase tracking ability of the PLL of FIG. 2 according to one exemplary implementation of the present invention.
Figure 6B:
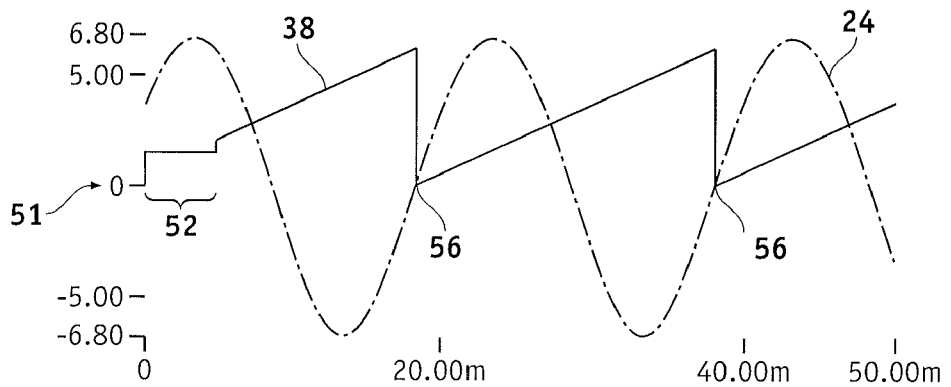

Referring now to FIG. 6A and FIG. 6B, the phase tracking operation of the present invention can be seen. FIG. 6A represents the ideal case of zero degrees of phase difference (51) between the incoming power grid voltage 24 and the output phase locked signal (38). After a quarter cycle time delay 52, the phase locked loop tracking waveform 38 demonstrates that the PLL 22 has achieved phase lock with the incoming power grid voltage as can be seen at all of the zero-crossings 56. As another example, FIG. 6B illustrates a power grid voltage arriving thirty degrees out of phase (58), however, after the same quarter cycle delay 52, the PLL 22 of the present invention has achieved phase lock with the incoming power grid voltage as can be seen from the zero-crossings 56. However, it will be understood by those skilled in the art that the PLL 22 of the present invention can acquire phase lock across any phase shift of the incoming power grid signal within a quarter cycle of the incoming waveform.

Figure 7:
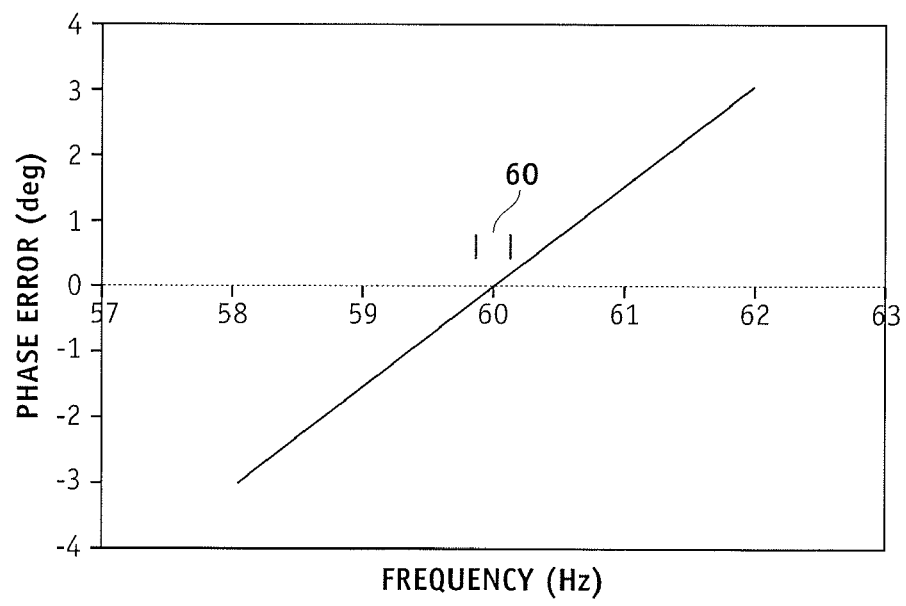
FIG. 7 illustrates the linearity of phase tracking across a wide range of frequency variations according to an exemplary implementation of the present invention.

While rapid phase locking performance is provided by the present invention, the PLL 22 of the present invention must be able to maintain a phase lock over a wide range of incoming power grid voltage phase error (as discussed above in reference to FIG. 5). Referring now to FIG. 7, the phase lock performance of the present invention over a wide range of incoming power grid phase error can be seen. The present invention provides reliable phase lock performance from 58 Hz to 62 Hz; well beyond the nominal frequency deviation discussed in conjunction with FIG. 5. More particularly, as can be seen (60) around the normal deviation, the present invention reliably achieves phase lock after only one-quarter cycle given the normal incoming power grid voltage phase error to be able to charge an electric vehicle or a hybrid vehicle from a standard single-phase power grid voltage. Accordingly, the present invention affords the opportunity to recharge the battery array of an electric vehicle or a hybrid vehicle from a standard single-phase power grid voltage without operating the vehicle or consuming fuel.

Some of the embodiments and implementations are described above in terms of functional and/or logical block components and various processing steps. However, it should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A hybrid vehicle, comprising:
   a gas engine;
   a battery array powering an electric motor to propel the hybrid vehicle in a first mode;
   a generator, driven by the gas engine, for recharging the battery array; and
   a charging control circuit coupled to a single phase power grid voltage for recharging the battery array from a charging signal phase locked to the single phase power grid voltage, the charging control circuit including a phase delay circuit for receiving the single phase power grid voltage and generating a delayed signal therefrom, a transformation circuit for phase shifting each of the single phase power grid voltage and the delayed signal for respective processing by the charging control circuit and a phase locked loop circuit and to achieve phase lock within one-quarter phase of the single phase power grid voltage to provide the charging signal for recharging the battery array.

2. The hybrid vehicle of claim 1, wherein the delayed signal is delayed by one-quarter cycle from the single phase power grid voltage.

3. The hybrid vehicle of claim 1, wherein the delayed signal is orthogonal to the single phase power grid voltage.

4. The hybrid vehicle of claim 1, wherein the electric motor is an alternating current motor.

5. The hybrid vehicle of claim 1, wherein the electric motor is a direct current motor.

6. A method of charging a battery array in an electrically propelled vehicle, comprising the steps of:
   receiving a single phase power grid voltage;
   delaying the single phase power grid voltage to provide a delayed signal;
   transforming the single phase power grid voltage and the delayed signal to provide first and second phase shifted signals;
   processing the first phase shifted signals in a phase locked loop and processing the second phase shifted signal in a control circuit to achieve phase lock within one-quarter phase of the single phase power grid voltage to provide a charging signal phase locked to the single phase power grid voltage; and
   utilizing the charging signal to recharge a battery array of the electrically powered vehicle.

7. The method of claim 6, wherein the delayed signal is delayed by one-quarter cycle.

8. The method of claim 6 which includes the step of generating a second charging signal from a generator powered by a gas engine for charging the battery array while the electrically propelled vehicle is in motion.

9. A phase locked loop suitable for use in a vehicle at least partially propelled by a battery array, comprising:
   a delay circuit providing a delayed signal representing a delayed version of a single phase power grid voltage having a frequency in the range of 58 Hz to 62 Hz to a transformation matrix; and
   the transformation matrix providing a phase shifted delayed signal and a phase shifted single phase power control voltage respectively to a phase locked loop and a control circuit for providing a charging signal phase locked to the single phase power grid voltage;
   wherein, the phase locked loop can achieve phase lock to the single phase power control voltage across the frequency range of 58 Hz and 62 Hz in approximately one-quarter phase of the single phase power control voltage and the charging signal can be used to recharge the battery array while the vehicle is not in motion.

10. The phase locked loop of claim 9, wherein the delaying circuit delays the single phase power grid voltage by one-quarter cycle.

11. A vehicle powered by at least an electric motor, comprising:
   a charging control circuit coupled to a single phase power grid voltage having a frequency in the range of 58 Hz to 62 Hz for recharging a battery array from a phase locked signal, the charging control circuit including a phase delay circuit for receiving the single phase power grid voltage and generating a delayed signal therefrom, a transformation circuit for phase shifting each of the single phase power grid voltage and the delayed signal for respective processing by a control circuit and a phase locked loop to achieve phase lock across the frequency range of 58 Hz to 62 Hz within one-quarter phase of the single phase power grid voltage to provide the phase locked signal for recharging the battery array.

12. The vehicle of claim 11, including:
   a gas engine and a generator for charging the battery array while the vehicle is in operation.

13. The vehicle of claim 11, wherein the electric motor is an alternating current motor.

14. The vehicle of claim 11, wherein the electric motor is a direct current motor.

15. The vehicle of claim 11, wherein the delayed signal is delayed from the single phase power grid voltage by one-quarter cycle.

* * * * *